L. E. COWEY.
TIRE ALARM.
APPLICATION FILED MAY 15, 1908.
995,224.
Patented June 13, 1911.
2 SHEETS—SHEET 1.
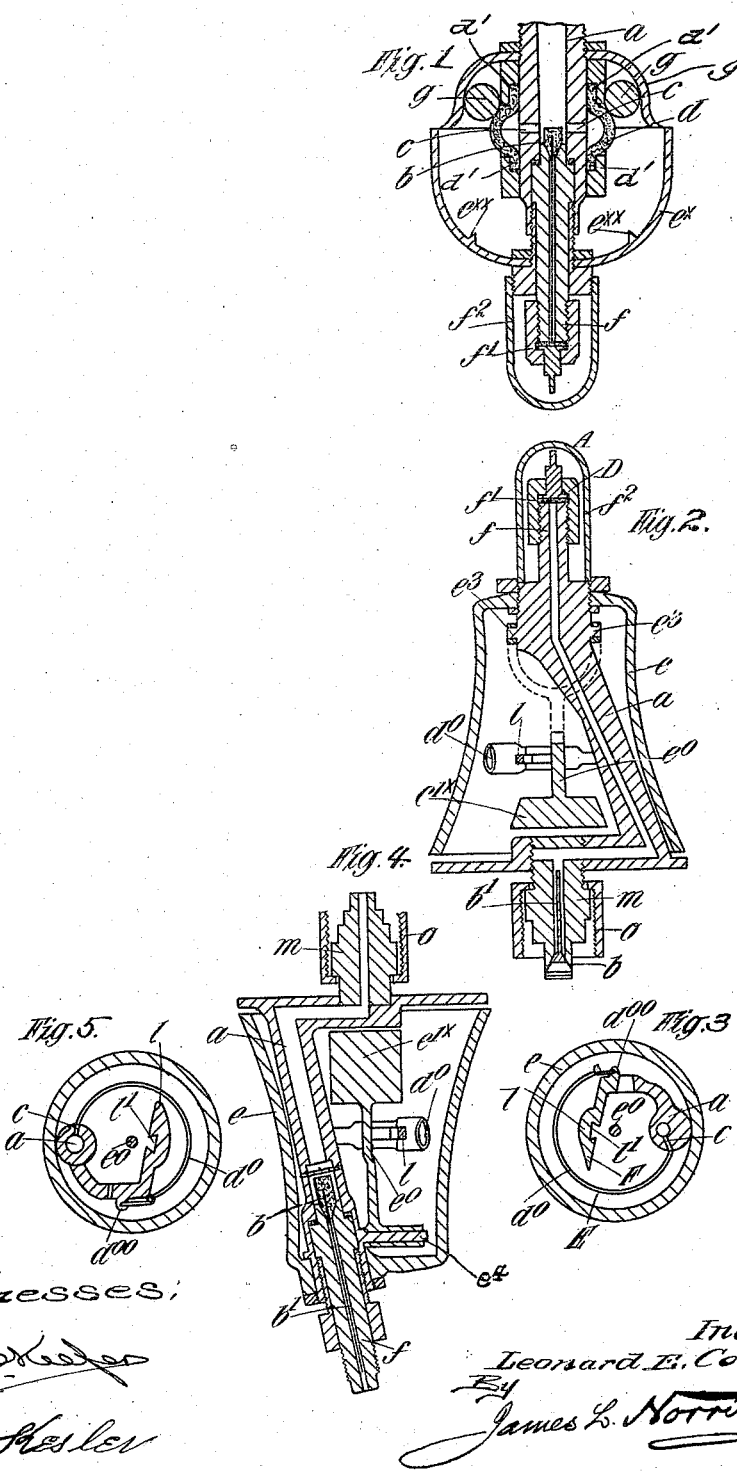

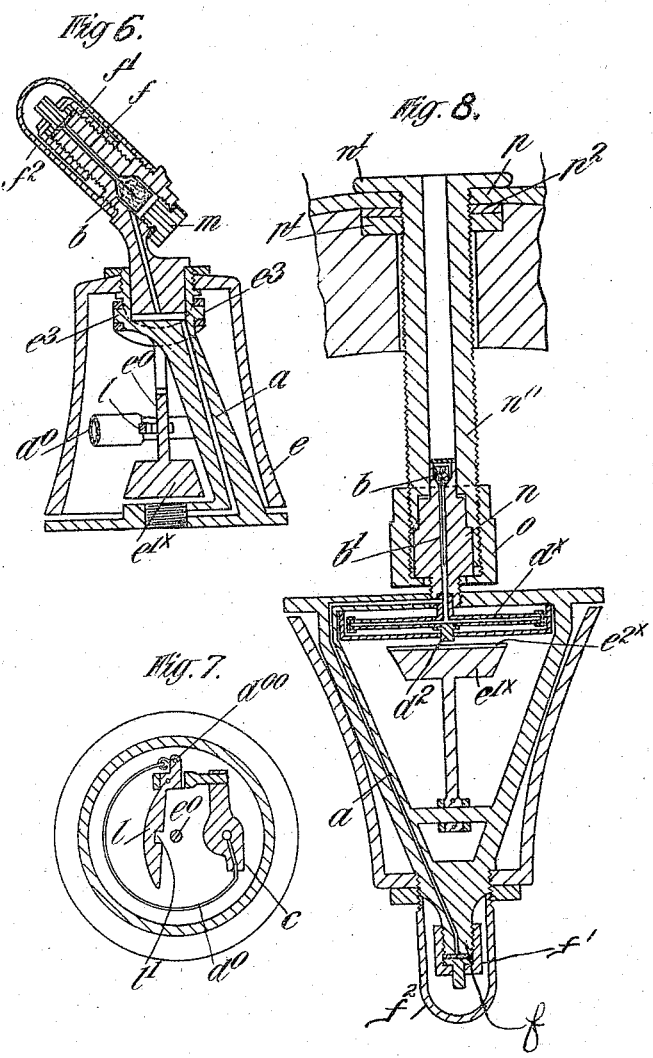

UNITED STATES PATENT OFFICE.

LEONARD EUGENE COWEY, OF KEW GARDENS, ENGLAND.

TIRE-ALARM.

995,224.  Specification of Letters Patent.  Patented June 13, 1911.

Application filed May 15, 1908. Serial No. 433,075.

*To all whom it may concern:*

Be it known that I, LEONARD EUGENE COWEY, a subject of the King of Great Britain, residing at Archer Works, Kew Gardens, in the county of Surrey, England, have invented certain new and useful Tire-Alarms, of which the following is a specification.

This invention relates to inflatable tires for the wheels of vehicles and has for its chief object to provide a device whereby the occupants or driver of the vehicle will be notified in the event of a tire leaking owing to its becoming punctured or otherwise.

According to my invention the said device comprises a bell, whistle, or other sound emitting contrivance which is so arranged as to be normally inactive, but which, in the event of the pressure within the tire materially falling, will automatically become active and in that way give audible indication that the tire is faulty; the air in the tire by communicating with the apparatus serving to operate the latter.

In order that the said invention may be clearly understood and readily carried into effect I will proceed to describe the same with reference to the accompanying drawings which illustrate examples of several arrangements of the device adapted for accomplishing the objects aimed at.

Figure 1 is a section representing an arrangement in which resilient tube or member is adapted to release loose bodies or balls which when free strike against a fixed bell as a result of the vibration or jolting incidental to the action of the vehicle. Figs. 2 and 3 are respectively a vertical and a horizontal section showing an arrangement in which the normally expended tube or member is adapted to hold the clapper from vibratory movement, the clapper being arranged in suspension. Figs. 4 and 5 are views respectively similar to Figs. 2 and 3 illustrating another arrangement. Figs. 6 and 7 are respectively a vertical and a horizontal section of a further arrangement in which the normally expended tube or member holds the clapper from vibratory movement. Fig. 8 is a section of a further form of the device in which the air is caused to be released for the purpose of operating a bell as in the arrangements shown in Figs. 1 to 7 inclusive.

Referring to Fig. 1, the purpose of the present invention is effected by providing in the tube $a$ of the inflation valve $b$, at a point between the valve and the inlet to the tire, one or more lateral holes or perforations $c$, $c$. About the said perforated part of the tube $a$ is arranged a resilient tube or chamber $d$, the inclosing tube or member being composed of india rubber or other resilient material. In the drawing the resilient material $d$ is held hermetically at $d'$ $d'$ to the inflation tube $a$. When the pressure within the tire is at the normal degree, the said member $d$ will be caused to expand or bulge outward under the influence of the said pressure and retain the expended formation so long as the pressure within the tire exists at the normal degree. If however, the pressure falls materially, owing to a puncture of the tire occurring, or a leakage in the valve or other parts, the said member $d$ will contract or collapse and approach or lie close to the tube $a$. The changes in the form of the member or tube $d$ have in accordance with whether said member is expanded or collapsed a restraining or releasing effect on loose bodies or balls $g$, which are normally held by the member $d$ against a hood $g'$ fixed on the tube $a$ and which when released, consequent to the collapse of the member $d$, fall against a fixed bell $e^x$ and vibrate thereon consequent to the jolting of the vehicle.

In order to prevent the loose bodies from falling too far and simply lying against the inflation tube at the lower part of the bell, pegs or flanges $e^{xx}$ may be provided within the said lower part of the bell, to limit the extent to which the said loose bodies can descend when released. The inflating pump is applied to the nipple $f$, a cap $f'$ being applied after the operation of pumping up the tire has been accomplished. It is also preferred to employ an outer protecting cap or hood $f^2$.

According to the construction illustrated in Figs. 2 and 3, the inflation of the tire is effected by applying the pump to the nipple or nozzle $f$ the air passing by way of the valve $b$ to the tire. The tube $a$ is provided with a lateral hole or with lateral holes $c$ previously referred to (which do not appear in Fig. 2 but are shown in Fig. 3) whereby the resilient tube or member $d^0$ becomes inflated. When the tire is pumped up, the valve $b$ prevents the air escaping from the tire, but the said valve and seating being preferably of metal do not effect an air tight closure until the cap $f'$ is screwed in place and prevents leakage. The leakage then however has the effect of charging the tube $d^0$ with air at the pressure of that contained in the tire with the result that the tube $d^0$ becomes slightly distended and has a tendency to straighten out. This has the effect of exerting a pull at the point $d^{00}$ where the tube $d^0$ is connected with the trigger or catch $l$ which, by means of the notch $l'$, normally engages the shank $e^0$ of the clapper $e'^x$ and holds the same from vibratory movement. The clapper is suspended from the pins or projections $e^3$ $e^3$ on the tube $a$.

Referring to Figs. 4 and 5 the arrangement is similar to that last described with the exception that the valve is situated at the lower part of the device and may be of the usual rubber plunger type and perfectly air tight. In this construction the air pressure in the device and in the tire will be in uninterrupted communication. The clapper $e'^x$ is pivoted on a projection $e^4$ on the tube $a$.

The arrangement illustrated in Figs. 6 and 7 is again similar in character to that described with reference to Figs. 2 and 3, a different means being provided for effecting the removal of the valve $b$ when required from any cause. These means consist of a screwed plug $m$, the nozzle $f$ being disposed at an angle to the main part of the tube $a$ and for convenience of manufacture being formed separately therefrom.

The construction shown in Fig. 8 embodies the same principle of operation as the forms above described and includes an expandible chamber $d^x$ which is filled with air under pressure as the result of pumping up the tire. The pump for this purpose is applied to the nipple $f$, the pressure fluid on passing to the valve $b$ by way of the tube or passage $a$ charging the chamber $d^x$. The action of this arrangement is as follows:—Under the pressure of the air the chamber is maintained expanded, the pin $d^2$ holding the clapper $e'^x$ from vibrating by engaging in the transverse groove or recess $e^{2x}$. Upon a decrease of pressure in the tire and a corresponding decrease of pressure in the said chamber occurring, the pin $d^2$ recedes from the clapper and disengages the same whereupon it is free to vibrate as the result of the jolting of the vehicle. In this figure I have shown a means of attaching the apparatus to the valve body, the said means comprising a block $n$ adapted to fit the bore or end of the valve body $n^0$ the parts being held in place by the screwed thimble or coupling piece $o$. The inner end of the valve body $n^0$ is flanged as at $n'$ and held in the air tube $p$ by the nut $p'$ and washer $p^2$. The valve body is passed through a hole in the rim in the usual manner, the exterior of the said body being screw threaded to receive the nut $p$ and the coupling piece $o$.

What I claim and desire to secure by Letters Patent of the United States is:—

1. In an inflatable tire, the combination with the air tube, of a bell, a resilient expansible member in communication with the air tube, and an operating member for said bell which is normally secured from movement by the resilient expansible member but released thereby upon a reduction of pressure in the air tube so as to operate the bell.

2. In an inflatable tire, the combination of an air tube, an inflation valve connected therewith, a bell, an operating member pertaining to said bell and inflatable means in communication with the air tube which normally secures the said operating member from movement but which upon a reduction of pressure in the air tube releases the same to operate the bell.

3. In an inflatable tire, the combination of an air tube, an inflation valve connected therewith, a bell, a clapper for said bell and inflatable means in communication with the air tube which normally secures the said clapper from movement but which upon a reduction of pressure in the air tube releases the same to operate the bell.

In testimony whereof I affix my signature in presence of two witnesses.

LEONARD EUGENE COWEY.

Witnesses:
T. SELBY WARDLE,
WALTER J. SKERTEN.

Copies of this patent may be obtained for five cents each, by addressing the "Commissioner of Patents, Washington, D. C."